United States Patent
Tsuchiuchi

(10) Patent No.: US 6,947,705 B2
(45) Date of Patent: Sep. 20, 2005

(54) METHOD, APPARATUS, AND SYSTEM FOR DELIVERING CONTENTS

(75) Inventor: Takayasu Tsuchiuchi, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 395 days.

(21) Appl. No.: 10/097,003

(22) Filed: Mar. 14, 2002

(65) Prior Publication Data

US 2003/0008618 A1 Jan. 9, 2003

(30) Foreign Application Priority Data

Jul. 5, 2001 (JP) .................................... 2001-205151

(51) Int. Cl.[7] ................................................. H04H 1/14
(52) U.S. Cl. ................ 455/3.06; 455/344; 455/556.1; 455/557; 455/421; 455/412.1; 455/566; 455/41.2
(58) Field of Search ............................. 455/3.06, 3.01, 455/3.03, 3.05, 556.1, 557, 344, 421, 412.1, 566, 569.1, 41.2, 41.3

(56) References Cited

U.S. PATENT DOCUMENTS

| | | | | |
|---|---|---|---|---|
| 5,914,941 A | | 6/1999 | Janky | 370/313 |
| 5,959,945 A | * | 9/1999 | Kleiman | 455/3.06 |
| 6,192,340 B1 | * | 2/2001 | Abecassis | 704/270 |
| 6,505,160 B1 | * | 1/2003 | Levy et al. | 704/270 |
| 6,615,186 B1 | * | 9/2003 | Kolls | 705/26 |
| 6,650,901 B1 | * | 11/2003 | Schuster et al. | 455/456.1 |
| 2001/0041588 A1 | * | 11/2001 | Hollstrom et al. | 455/556 |
| 2002/0049037 A1 | * | 4/2002 | Christensen et al. | 455/3.06 |
| 2002/0065778 A1 | * | 5/2002 | Bouet et al. | 705/57 |
| 2002/0068610 A1 | * | 6/2002 | Anvekar et al. | 455/560 |
| 2002/0077060 A1 | * | 6/2002 | Lehikoinen et al. | 455/41 |

FOREIGN PATENT DOCUMENTS

JP            2000-134147            5/2000

* cited by examiner

*Primary Examiner*—Vivian Chin
*Assistant Examiner*—Minh D. Dao
(74) *Attorney, Agent, or Firm*—Finnegan, Henderson, Farabow, Garrett & Dunner, L.L.P.

(57) ABSTRACT

There is provided a music delivery method of delivering contents from a music delivery apparatus to a playback apparatus. Guidance information associated with music data is sent from the music delivery apparatus via a radio communication to the music playback apparatus within a communication range. The music data is sent from the music delivery apparatus via a radio communication to the music playback apparatus in accordance with an instruction from the music playback apparatus that received the guidance information.

1 Claim, 5 Drawing Sheets

Information exchange via radio

METHOD, APPARATUS, AND SYSTEM FOR DELIVERING CONTENTS

CROSS-REFERENCE TO RELATED APPLICATIONS

This application is based upon and claims the benefit of priority from the prior Japanese Patent Application No. 2001-205151, filed Jul. 5, 2001, the entire contents of which are incorporated herein by reference.

BACKGROUND OF THE INVENTION

1. Field of the Invention

The present invention relates to a method, apparatus, and system for delivering contents such as music or the like.

2. Description of the Related Art

In recent years, various music players have become available on the market in accordance with the use patterns and purposes of use of the users. As an example of such music player, an MP3 player as a dedicated music player is known. A music player can also be implemented by installing music playback software in a personal computer or portable information terminal (PDA). Such music player includes a memory for recording and saving music data to be played back, and various methods for saving data in a memory are available.

In order to allow the user to listen to music by such music player, music data as a source of the music must be retrieved from a music delivery apparatus (music vending terminal or the like) equipped in advance in a public place. In this case, the owner of a music player establishes wired connection between the music vending terminal equipped in the public place and his or her music player, and follows a procedure required to purchase music data.

Note that Jpn. Pat. Appln. KOKAI Publication No. 2000-134147 discloses a data communication system in which when a purchaser-side device directly or indirectly carried by a purchaser approaches a vendor (vendor-side device), a data communication is automatically started between these two devices to implement advertisement of articles from the vendor-side device. This data communication system uses a radio beacon to detect a partner device, and actually exchanges main data via a public line.

Upon building the music delivery apparatus, since many types of recording devices must be equipped to cope with various kinds of recording media, the apparatus cost increases considerably. Also, since wired connection must be established between the music player possessed by the user and the music delivery apparatus, the procedure required for the user is complicated. Furthermore, the durability of a connection device must be taken into consideration, since physical connection must be established.

Hence, it is demanded to present a technique that can efficiently deliver contents such as music or the like to an information processing apparatus operated by a user without forcing the user to follow a complicated procedure.

BRIEF SUMMARY OF THE INVENTION

According to one aspect of the present invention, there is provided a contents delivery method of delivering contents from a contents delivery apparatus to an information processing apparatus, the method comprising: sending guidance information associated with contents from the contents delivery apparatus via a radio communication to the information processing apparatus within a communication range; and sending the contents from the contents delivery apparatus via a radio communication to the information processing apparatus in accordance with an instruction from the information processing apparatus that received the guidance information.

According to another aspect of the present invention, there is provided a music delivery method of delivering contents from a music delivery apparatus to a music playback apparatus, the method comprising: sending guidance information associated with music data from the music delivery apparatus via a radio communication to the music playback apparatus within a communication range; and sending the music data from the music delivery apparatus via a radio communication to the music playback apparatus in accordance with an instruction from the music playback apparatus that received the guidance information.

According to still another aspect of the present invention, there is provided a contents delivery system for delivering contents from a contents delivery apparatus to an information processing apparatus, the system comprising: a guidance information sending unit provided in the contents delivery apparatus and configured to send guidance information associated with contents from the contents delivery apparatus via a radio communication to the information processing apparatus within a communication range; and a contents sending unit provided in the contents delivery apparatus and configured to send the contents from the contents delivery apparatus via a radio communication to the information processing apparatus in accordance with an instruction from the information processing apparatus that received the guidance information.

According to still another aspect of the present invention, there is provided a music delivery system for delivering contents from a music delivery apparatus to a music playback apparatus, the system comprising: a guidance information sending unit provided in the music delivery apparatus and configured to send guidance information associated with music data from the music delivery apparatus via a radio communication to the music playback apparatus within a communication range; and a music data sending unit provided in the music delivery apparatus and configured to send the music data from the music delivery apparatus via a radio communication to the music playback apparatus in accordance with an instruction from the music playback apparatus that received the guidance information.

According to still another aspect of the present invention, there is provided a music delivery apparatus configured to deliver music data to a music playback apparatus, the music delivery apparatus comprising: a guidance information sending unit configured to send guidance information associated with music data via a radio communication to the music playback apparatus within a communication range; and a music data sending unit configured to send the music data via a radio communication to the music playback apparatus in accordance with an instruction from the music playback apparatus that received the guidance information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described hereinafter with reference to the accompanying drawings.

Figure 1:
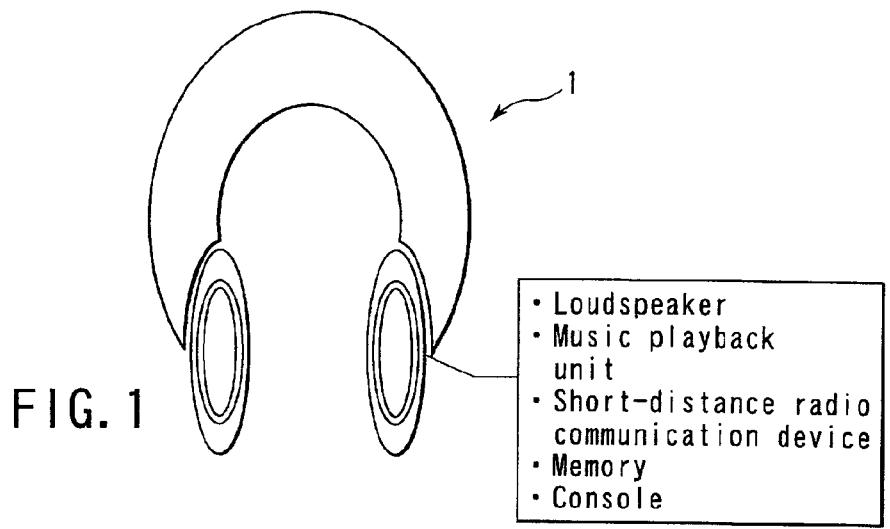
FIG. 1 is a view showing the outer appearance of a music player used in an embodiment of the present invention.

FIG. 1 shows the outer appearance of a music player used in an embodiment of the present invention. A music player 1 is a portable device having a function of playing back music data, and has a headphone or earphone shape, as shown in FIG. 1. The music player 1 includes a loudspeaker, music playback unit, short-distance radio communication device, memory, console, and the like, as will be described in detail later.

Figure 2:
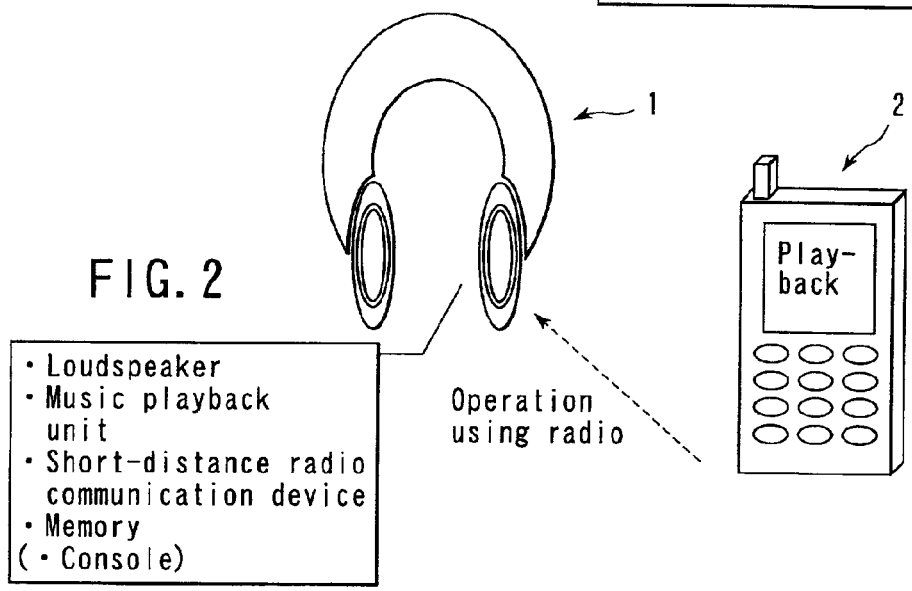
FIG. 2 is a view for explaining a case wherein the music player main body is operated by a console equipped on another device.

As a modification, the music player 1 main body may be operated using a console equipped on another device without using the console of the music player 1. In such case, as shown in, e.g., FIG. 2, a portable telephone (or portable terminal) 2 having the same short-distance radio communication device as that of the music player 1 can be used to operate the music player 1 main body by a radio communication via the short-distance radio communication device.

Figure 3:
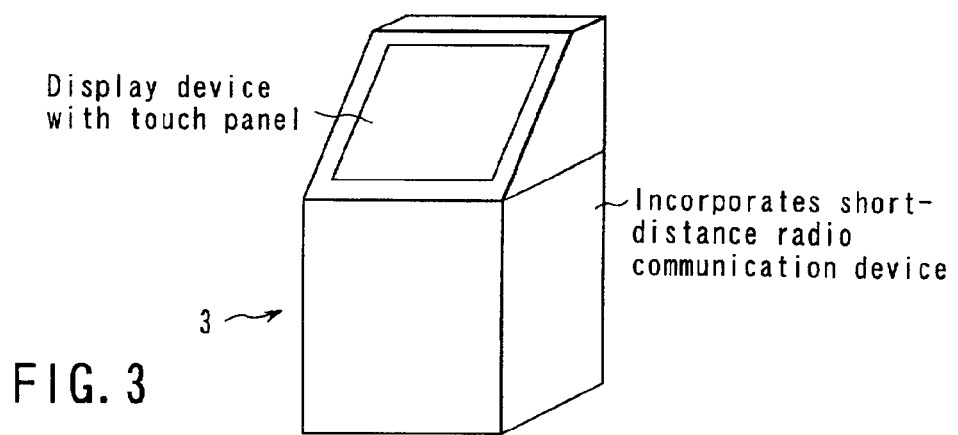
FIG. 3 is a view showing the outer appearance of a music vending terminal (music delivery apparatus) used in the embodiment of the present invention.

FIG. 3 shows the outer appearance of a music vending terminal (music delivery apparatus) 3 used in the embodiment of the present invention. The music vending terminal 3 is a terminal which is equipped in a public place (e.g., storefront), and its principal purpose is to vend music data. This music vending terminal 3 incorporates a display device with a touch panel, and a short-distance radio communication device. The music vending terminal displays information for the user, allows the user to make input operation via the touch panel, and can send guidance and music data to the music player 1 via the short-distance radio communication device.

Figure 4:
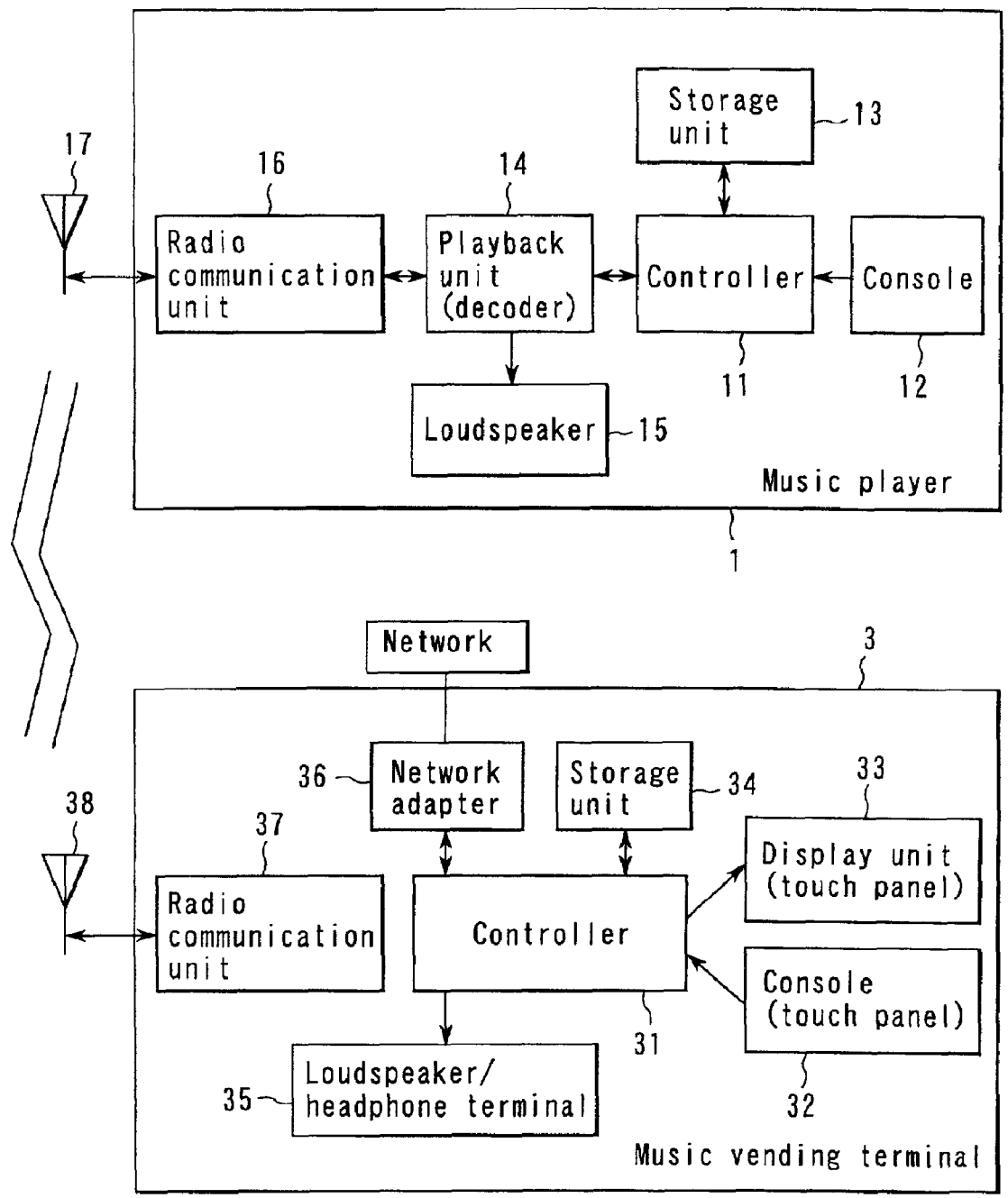
FIG. 4 is a block diagram showing the arrangements of the music player and music vending terminal used in the embodiment.

FIG. 4 is a block diagram showing the arrangements of the music player 1 and music vending terminal 3 used in this embodiment.

The music player 1 includes a controller 11, console 12, storage unit (internal/external memory) 13, playback unit (decoder) 14, loudspeaker 15, radio communication unit 16, antenna 17, and the like.

The controller 11 controls the operation of the overall music player 1 and executes processes associated with various kinds of control.

The console 12 is operated by a user, e.g., an owner of the music player 1, and is used to make operations associated with a playback process, recording process, radio communication process, and the like.

The storage unit 13 stores and records data such as music data and the like in a predetermined format.

The playback unit 14 executes a playback process (decode process) of audio information such as music data or the like stored in the storage unit 13.

The loudspeaker 15 outputs audio played back by the playback process of the playback unit 14.

The radio communication unit 16 corresponds to a radio communication interface complying with, e.g., Bluetooth™ standards, and executes various setup processes and control processes associated with short-distance radio communications.

The antenna 17 transmits a radio wave to a device as a radio communication partner, and receives a radio wave from that device.

The music vending terminal 3 includes a controller 31, console (touch panel) 32, display unit (liquid crystal display panel) 33, storage unit 34, loudspeaker/headphone terminal 35, network adapter 36, radio communication unit 37, antenna 38, and the like.

The controller 31 controls the operation of the overall music vending terminal 3, and executes processes associated with various kinds of control.

The console 32 is operated by the user of the music vending terminal 3 (e.g., owner of the music player 1) via the touch panel (or cursor keys), and is used to make operations associated with guidance, music purchase, and the like.

The display unit 33 includes a liquid crystal display panel or the like, and provides various kinds of guidance and service associated with music. For example, the display unit 33 displays items used to individually identify music players within the communication range of the music vending terminal 3 on the screen, guidance for music purchase, and the like.

The storage unit 34 stores guidance information, music information, and the like.

The loudspeaker/headphone terminal 35 outputs guidance information, music information, and the like as voice to the user.

The network adapter 36 controls to exchange information with an external network. For example, the network adapter 36 acquires music information saved in advance, and feature information indicating the use tendencies of music data for respective music players via the network if required.

The radio communication unit 37 corresponds to a radio communication interface complying with, e.g., Bluetooth™ standards, and executes various setup processes and control processes associated with short-distance radio communications.

The antenna 38 transmits a radio wave to a device as a radio communication destination, and receives a radio wave from that device.

Note that music data is provided from the storage unit 34 of the music vending terminal 3 or from an external server to the user via the network.

Figure 5:
FIG. 5 is a view showing a state wherein the user makes operation for purchasing music data at the music vending terminal of this embodiment.

The user makes operations for music purchase at the music vending terminal while wearing the music player 1 or its part on his or her ears, as shown in FIG. 5, thereby downloading desired music data into the music player 1. In this case, music data is downloaded from the music vending terminal 3 to the music player 1 via the short-distance radio communication device (radio communication unit 37 and antenna 38) equipped in the music vending terminal 3 and that (radio communication unit 16 and antenna 17) equipped in the music player 1.

Figure 6:
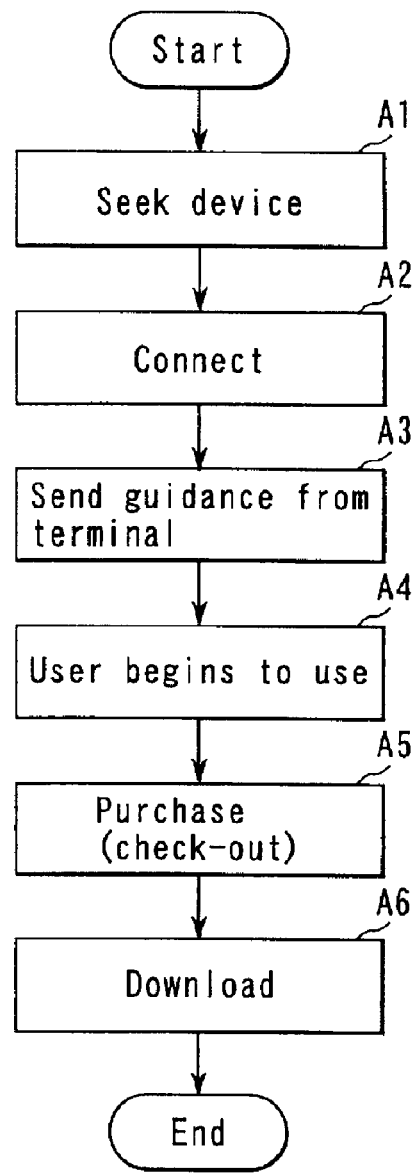
FIG. 6 is a flow chart showing the flow of the overall process upon purchasing music data.

The flow of the overall process upon purchasing music data will be explained below with reference to the flow chart in FIG. 6.

The music vending terminal 3 seeks a device (music player 1 in this case) having the same type of short-distance radio communication device, which is present around the music vending terminal 3 (within a connectable communication range) (step A1).

When the user approaches the music vending terminal 3, the music vending terminal 3 detects arrival of the music player 1 within the range (finds the music player 1), and tries to establish connection to the user's music player 1 via the short-distance radio communication device (step A2).

If connection has succeeded, the music vending terminal 3 interrupts the music player 1 and voice guidance data and music data to the music player 1 (step A3). In this way, push-button guidance can be provided to the owner of the music player 1, and the user can acquire guidance without any special notice.

Note that a plurality of devices of the same type may be found by seek of the music vending terminal 3. Details of the process in such case will be explained later.

The user perceives the presence of the music vending terminal 3, and starts operations at the music vending terminal 3 (step A4).

Audio and music data generated upon operation are played back by the music player 1, that the user wears, via the short-distance radio communication devices. The user makes operations at the music vending terminal 3, determines to purchase given music data, proceeds to check out if that music data is pay-delivery data (step A5), and acquires the music data by downloading it (step A6). Note that the check-out procedure at that time can be implemented using a known method, which is used normally.

Figure 7:
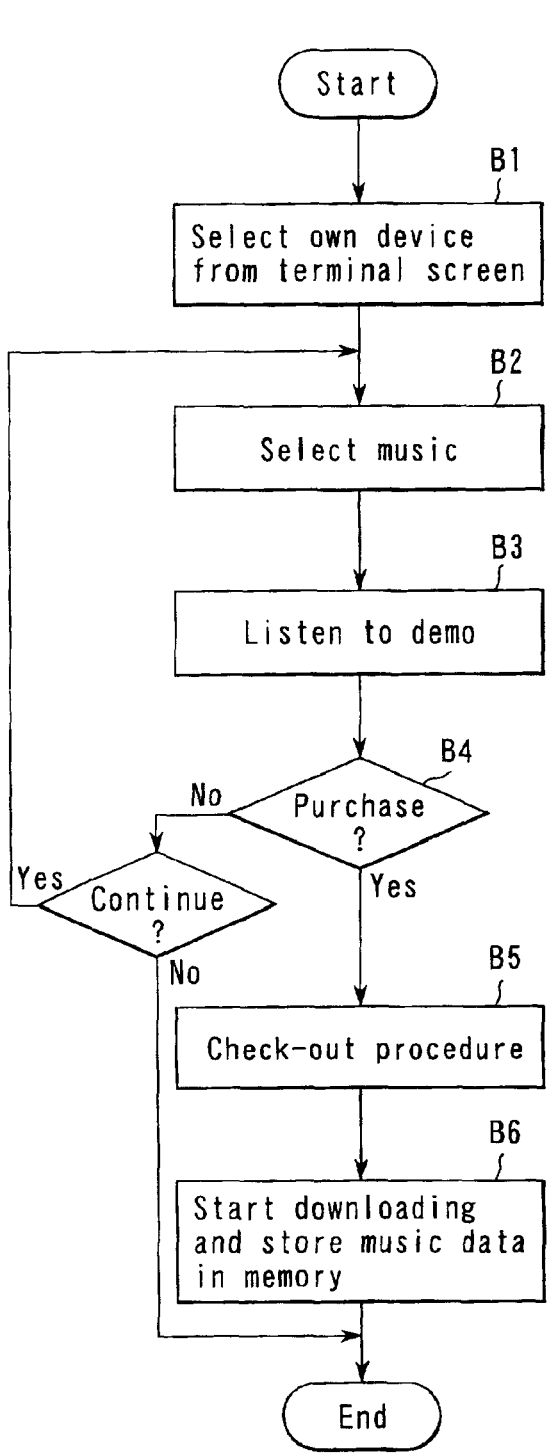
FIG. 7 is a flow chart showing the process on the user's side.

The flow of the process on the user's side will be explained below with reference to the flow chart in FIG. 7. The process in this flow chart corresponds to steps A4 to A6 in FIG. 6.

Assume that a list of items indicating music players which have established connection to the music vending terminal 3 and are ready to communicate is displayed on the display unit 33 (on the touch panel screen) of the music vending terminal 3. The user selects his or her music player 1 by, e.g., pressing a portion indicating it in the list on the display unit 33 of the music vending terminal 3 (step B1).

The user selects a desired music piece by operating the music vending terminal 3 (step B2). The user listens to a demo of that music piece in this case (step B3).

Note that the user can listen to the demo via the loudspeaker or a headphone connected to the headphone terminal, which is equipped on the music vending terminal 3. In this case, music data may be played back by the music player possessed by the user via the short-distance communication device (radio communication unit 37 and antenna 38).

The user determines if he or she wants to purchase that music data (step B4). If the user determines to purchase the music data, he or she proceeds to check out by a known method if the selected music data is pay delivery data (step B5), and acquires the music data by downloading it (step B6). On the other hand, if the user determines that he or she does not want to purchase that music data (N in step B4), he or she cancels the procedure, and determines if he or she wants to select music data again (step B7). If the user wants to select music data again, the process from step B2 is repeated.

Note that music data is acquired via the short-distance radio communication device, and is recorded in the storage unit 13 of the music player 1. For this reason, upon receiving a music data delivery service, the user need neither insert a recording medium into the music vending terminal nor establish wired connection of the music player, but he or she need only stand near the music vending terminal. Also, it is effective to take amusement measure by displaying an advertising window or a window that entertains the user on the music vending terminal 3 during the data acquisition time.

The radio communication units 16 and 37 respectively have unique identification numbers. The music vending terminal 3 can discriminate the music player 1 owned by the user on the basis of the identification number, and can specify the user (or the device possessed by the user). The music vending terminal 3 may have a function of recognizing a purchase tendency with reference to feature information that indicates the use history for each music player, which is saved in an external server, and preferentially proposing music pieces in the field of user's interest. Furthermore, it is also possible to grant certain privileges to a given user depending on his or her purchase record. An example of the flow of the process in such case will be explained below.

Figure 8:
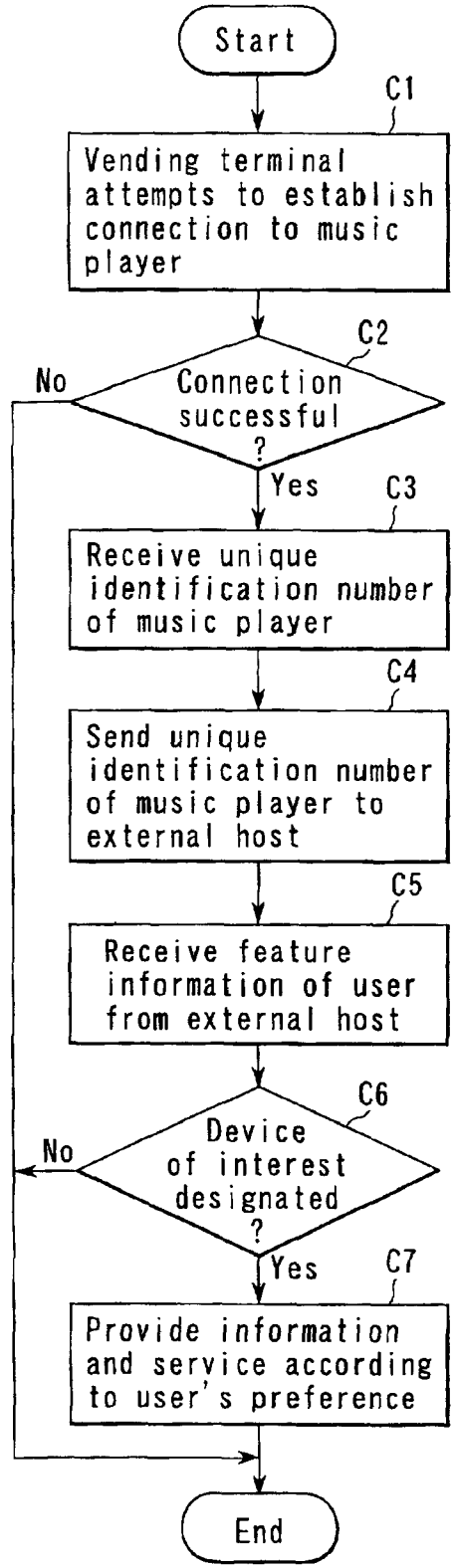
FIG. 8 is a flow chart showing the flow of a process according to the first example using feature information.

The flow of the process according to the first example using the feature information will be explained first with reference to the flow chart in FIG. 8. This process corresponds to steps A2 and A3 in FIG. 6.

Assume that the music vending terminal 3 is registered in advance with feature information which indicates the use history of music data of each user.

The music vending terminal 3 attempts to establish connection to a nearby music player 1 (step C1). If connection has succeeded and a connection procedure is done (step C2), the music player 1 sends the identification number unique to its radio communication device, and the music vending terminal 3 receives that number (step C3).

The music vending terminal 3 sends the received identification number to an external host via the network (step C4). The external host extracts the saved feature information of the user from its recording device using the unique identification number, and sends the extracted information to the music vending terminal 3. The music vending terminal 3 receives the feature information (step C5).

If the user designates the music player as a radio communication target (step C6), the music vending terminal 3 starts provision of information and services according to the preference of the owner of that music player using the received feature information (step C7).

Figure 9:
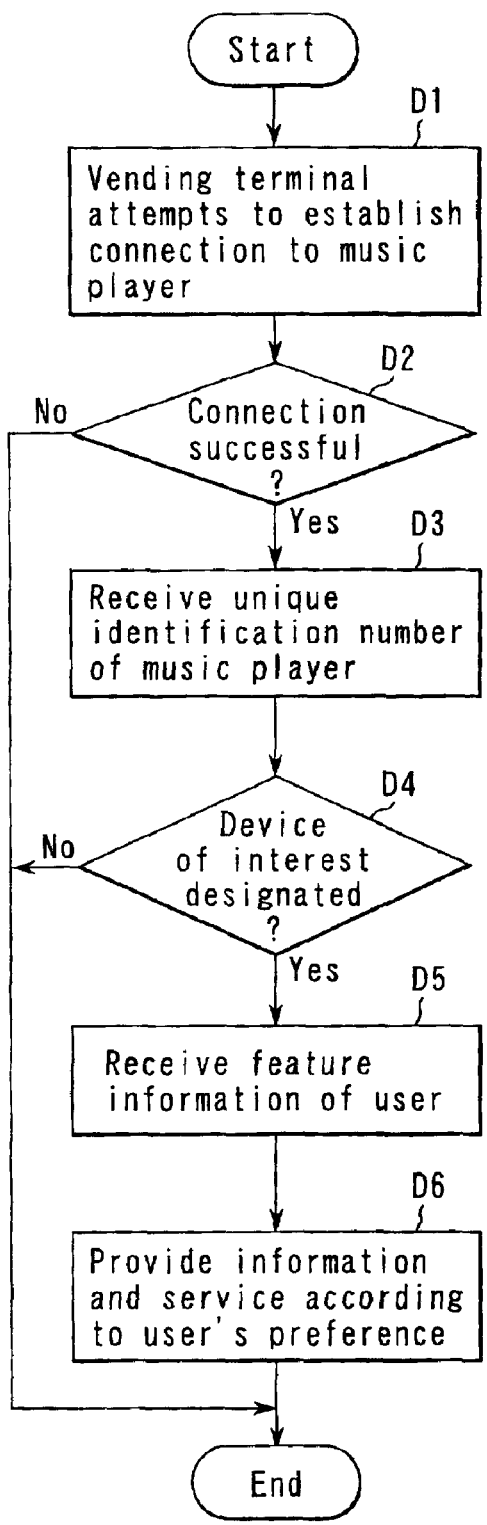
FIG. 9 is a flow chart showing the flow of a process according to the second example using feature information.

The flow of the process according to the second example using the feature information will be explained below with reference to the flow chart in FIG. 9. This process corresponds to steps A2 and A3 in FIG. 6.

The music vending terminal 3 attempts to establish connection to a nearby music player 1 (step D1). If connection has succeeded and a connection procedure is done (step D2), the music player 1 sends an identification number unique to its radio communication device, and the music vending terminal 3 receives that number (step D3).

After the user designates the music player as a radio communication target (step D4), the music vending terminal 3 receives feature information indicating the use tendency (use history or the like) of music data of that music player from the music player (step D5), and starts provision of information and services according to the preference of the user by analyzing the received feature information (step D6).

Upon completion of use, the use record generated in the above process is preferably recorded on the music player side for the next use. In addition, information of the field of particular interest to the user may be registered in advance in the music player. In this way, information to be provided can be selected even in the first use.

Figure 10:
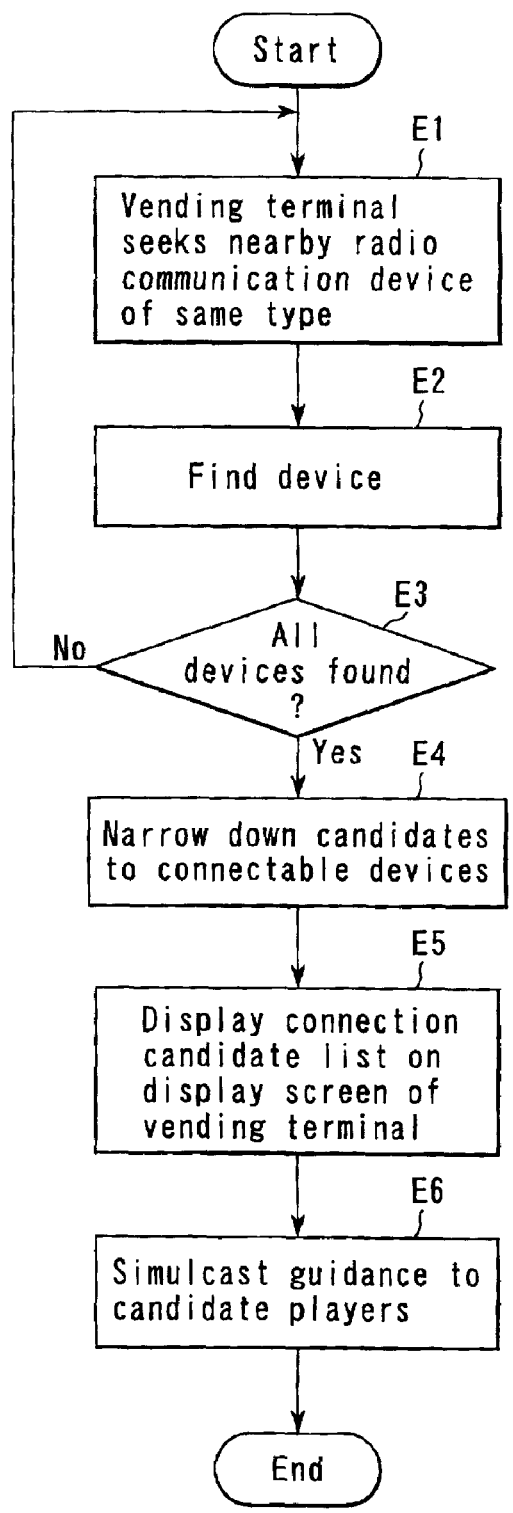
FIG. 10 is a flow chart showing the flow of a process when a plurality of music players are present around the music vending terminal.

The flow of the process executed when a plurality of music players are present around the music vending terminal 3 will be explained below with reference to the flow chart in FIG. 10. This process corresponds to steps A1 to A3 in FIG. 6.

The music vending terminal 3 seeks a device which can communicate with it (step E1), finds a corresponding device around it to acquire information from that device (step E2), and repeats the process until it can detect all devices which can communicate with the terminal (step E3).

The music vending terminal 3 extracts the identification names of music players (those as connection candidates) that match the music delivery system from the acquired terminal information (step E4), and displays information (items and the like) which identifies these players on the display unit 33 of the music vending terminal 3 in the form of a list (step E5).

The short-distance radio communication device (radio communication unit 37 and antenna 38) of the music vending terminal 3 has a simulcast function, and the music vending terminal 3 sends guidance that prompts to use the terminal 3 to as many music players found upon seek as possible using the simulcast function (step E6).

The user who wants to use the music vending terminal 3 in practice selects his or her music player 1 on the basis of the identification number unique to the short-distance radio communication device of that music player 1 or a unique name that the user gave. As the selection method, music players detected as a result of seek are displayed as, e.g., icons on the display unit 33 of the music vending terminal 3, so that users can identify them, and the user touches the corresponding icon on the console 32 to select his or her music player. When the user is determined, the simulcast message is suspended, and guidance information is sent to only the music player of the current user until the current user completes an operation end procedure.

As described above, in this embodiment, the music player 1 includes a short-distance radio communication device complying with, e.g., Bluetooth™ standards, and the music delivery terminal 3 also includes a short-distance radio communication device of the same type. In this way, the music player 1 and music delivery terminal 3 can efficiently make a radio communication using a specific effective communication method. Hence, music delivery can be easily implemented using a radio communication without forcing the user to follow any complicated procedure unlike in wired connection or the like, and without taking the physical saving format of the partner recording device into consideration. Also, an easy-to-receive style can be realized while the user wears the music player or holds it in his or her bag or the like. Since the short-distance radio communication device itself uses a known device and method, its function is not limited to one. Also, the music player can be wirelessly controlled using an information portable terminal as a remote controller. Hence, various applications can be made, and a plurality of functions can be easily introduced.

Note that the present invention is not limited to the above embodiments, and various changes and modifications may be made without departing from the scope of the invention.

For example, in the description of the above embodiment, the music player 1 has a headphone or earphone shape. However, the present invention is not limited to such specific shape, and the music player 1 may have other shapes as long as it includes a short-distance radio communication device.

The music player 1 is not limited to a dedicated music player such as an MP3 player or the like, and may be implemented by installing music playback software in a personal computer, portable information terminal (PDA), portable telephone, and the like.

The user can obtain voice information from the music vending terminal 3 using a headphone which can be connected to the music player 1 via wire or radio. When the user does not use the headphone, since he or she cannot obtain voice information from the terminal from the headphone, voice information can be obtained via the loudspeaker/headphone terminal 35 equipped on the music vending terminal 3. Of course, even in such case, since a radio communication can be made, music delivery is not disturbed.

In the above embodiment, a music vending system (music delivery system) including the music player 1 and music vending terminal 3 is built. However, the contents to be dealt with are not limited to music data (audio information), and the present invention can be applied to other contents such as image information, text information, and the like. Such applications can be easily implemented as long as the music player 1 has a display unit that allows the user to view image information and text information. In such case, a contents delivery system is built by replacing the music player and music vending terminal by a contents player and contents delivery terminal, respectively.

As described in detail above, according to the present invention, contents such as music data and the like can be efficiently delivered to an information processing apparatus operated by a user without forcing the user to take a complicated procedure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A music delivery method of delivering contents from a music delivery apparatus equipped in a public space, said method comprising:

seeking, by the music delivery apparatus having a short-distance radio communication device, a music playback apparatus having a same type of short-distance radio communication device as the music delivery apparatus and present within a short-distance radio communication range;

trying to establish a connection to the music playback apparatus by the music delivery apparatus;

sending guidance information associated with music data from the music delivery apparatus via a short-distance radio communication to the music playback apparatus within a radio communication range when the connection has been successfully established;

sending the music data from the music delivery apparatus via a short-distance radio communication to the music playback apparatus in accordance with an instruction from the music playback apparatus that received the guidance information; and displaying items for individually identifying music playback apparatuses within the communication range on a screen of the music delivery apparatus, wherein the guidance information is sent via a short-distance radio communication to the music playback apparatus corresponding to an item designated from among the items displayed on the screen.

* * * * *